Jan. 15, 1952 — W. A. CROWDER — 2,582,418
FISHHOOK
Filed Feb. 3, 1950
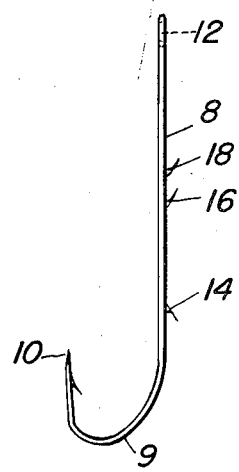
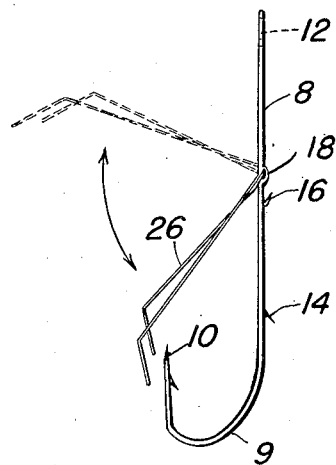
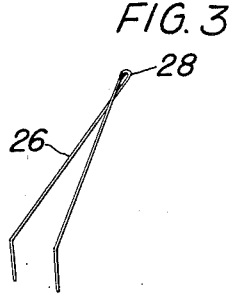
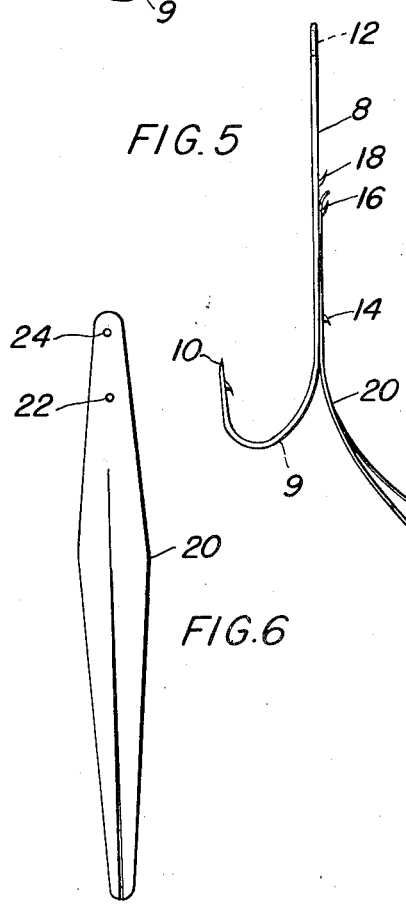
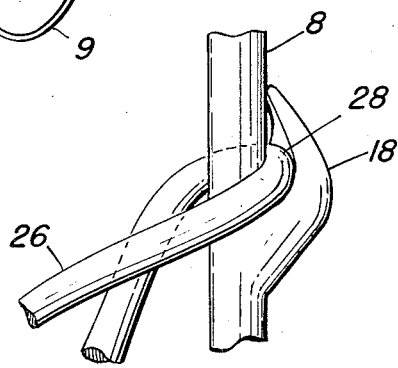
Inventor:
William A. Crowder
By William, Rich & ...
Attorneys Patented Jan. 15, 1952

2,582,418

UNITED STATES PATENT OFFICE 2,582,418

FISHHOOK

William A. Crowder, East Orange, N. J.

Application February 3, 1950, Serial No. 142,310

1 Claim. (Cl. 43—43.2)

This invention relates to fish-hooks, and the general object of the invention is to provide a fish-hook of the weed-less type which is adapted to have attached to it a "pork-rind" or its equivalent in a way that prevents fouling of it on the fish-hook or on any cooperating lure such as spoons, spinners and plugs.

The invention will be understood from the following description taken in connection with the accompanying drawing in which Fig. 1 is a side elevation of a weed-less fish-hook embodying the invention; Fig. 2 is a side elevation of the fish-hook before the weed-guard has been attached thereto; Fig. 3 is a perspective view of the weed-guard; Fig. 4 is a fragmentary view, on an enlarged scale, showing the construction by which the weed-guard is pivotally attached to the shank of the hook; Fig. 5 is a side elevation showing the hook, without the weed-guard, with a pork-rind attached thereto; and Fig. 6 is a plan view of a rubber strip, commonly called a "pork-rind" which is extensively used by fishermen.

Referring to the drawing, the fish-hook is shown as having a shank portion 8 from which extends a curved portion 9 terminating in a pointed and barbed end 10, the shank 8 being at its end formed into the usual eye 12. Before the hook has been tempered, it is provided, on the side of the shank 8 away from the curved portion 9, with a plurality of barbs 14, 16, 18. The barbs 14 and 16 project away from one another and are adapted to cooperate with a pork-rind 20 (or its equivalent) in the manner obvious from Figs. 5 and 6. As shown in Fig. 6, the pork-rind is provided with holes 22 and 24 which cooperate with the barbs 14 and 16. When the pork-rind 20 is applied to the barbs 14 and 16, as shown in Fig. 5, the portion of the pork-rind between said barbs is under slight tension which insures that the pork-rind will remain attached to the hook and will trail away from it in a manner that will prevent fouling of the pork-rind on the hook or any lure, such as spoons, spinners and plugs, which may be used with the hook.

As will be obvious from Figs. 1, 3 and 4, the weed-guard is in the form of a tempered wire 26 which is looped around and crossed over the shank portion 8 of the hook, and is pivotally secured thereto by the barb 18 which is crimped over the looped end 28 of the weed-guard, as shown in Figs. 1 and 4. In Fig. 1, the normal position of the weed-guard 26 is shown in full lines; and the dotted lines show the position to which the weed-guard may be moved by the fisherman when he is baiting the hook or removing a fish from it. The crossed portions of the weed-guard serve to limit its movement to the positions shown in Fig. 1, as will be obvious.

Thus I have provided a fish-hook of the weedless type, which is simple in construction, easy and cheap to manufacture in various sizes, and is adapted to have attached to it a pork-rind or its equivalent. The hook is provided with a simple weed-guard 26 which is pivotally attached to the shank 8 of the hook and may easily be swung away from the barbed point 10 when the hook is being baited or when a fish is being removed therefrom. In the event that the fisherman desires to use a pork-rind, it may be easily and quickly attached to the hook and will tail from it in a manner that prevents fouling of the pork-rind on the hook or on any cooperating lure that may be used with it.

What is claimed is:

A fish-hook having a shank portion from which extends a curved hook portion terminating in a pointed and barbed end, a weed-guard pivotally attached to said shank portion in the form of a wire looped around said shank portion with the loop of said wire on the side of said shank portion opposite to the side from which the curved hook portion extends and with the crossed portion of said wire adjacent to the side of said shank portion from which said curved hook portion extends, and a barb located on the side of said shank portion opposite to the side of the latter from which said curved hook portion extends and crimped over the looped portion of said wire, whereby said weed-guard is pivotally attached to said shank portion and may be moved out of its normal position in which the movement of the weed-guard is limited by the engagement of its crossed portion with said shank portion.

WILLIAM A. CROWDER.

REFERENCES CITED

The following references are of record in the file of this patent:

UNITED STATES PATENTS

| Number | Name | Date |
|---|---|---|
| 419,112 | Coit | Jan. 7, 1890 |
| 534,682 | Burgess | Feb. 26, 1895 |
| 832,929 | Stanley | Oct. 9, 1906 |
| 1,249,342 | Dahl | Dec. 11, 1917 |
| 1,533,092 | Bonbright | Apr. 14, 1925 |

FOREIGN PATENTS

| Number | Country | Date |
|---|---|---|
| 1,433 | Great Britain | Jan. 14, 1884 |